US010798022B2

(12) United States Patent
Balan et al.

(10) Patent No.: US 10,798,022 B2
(45) Date of Patent: Oct. 6, 2020

(54) SWITCH PROXY CONTROLLER FOR SWITCH VIRTUALIZATION

(71) Applicant: Google LLC, Mountain View, CA (US)

(72) Inventors: Horia Vlad Balan, Mountain View, CA (US); Amin Vahdat, Los Altos, CA (US); Vinay Kumar Bannai, Sunnyvale, CA (US); Zhehua Wu, San Jose, CA (US); Steven Gribble, Mountain View, CA (US); Andrew DeBock Ferguson, New York, NY (US); Muhammad Mukarram Tariq, San Jose, CA (US); Lorenzo Vicisano, Berkeley, CA (US); David Zats, Redwood City, CA (US)

(73) Assignee: Google LLC, Mountain View, CA (US)

( * ) Notice: Subject to any disclaimer, the term of this patent is extended or adjusted under 35 U.S.C. 154(b) by 12 days.

(21) Appl. No.: 16/253,645

(22) Filed: Jan. 22, 2019

(65) Prior Publication Data

US 2019/0173807 A1 Jun. 6, 2019

Related U.S. Application Data

(63) Continuation of application No. PCT/US2018/064000, filed on Dec. 5, 2018.
(Continued)

(51) Int. Cl.
*H04L 12/947* (2013.01)
*H04L 29/12* (2006.01)
*H04L 29/08* (2006.01)

(52) U.S. Cl.
CPC .......... *H04L 49/25* (2013.01); *H04L 61/2007* (2013.01); *H04L 67/2852* (2013.01)

(58) Field of Classification Search
CPC .. H04L 49/25; H04L 61/2007; H04L 67/2852
See application file for complete search history.

(56) References Cited

U.S. PATENT DOCUMENTS

| 2015/0281171 A1 | 10/2015 | Xiao |
| 2016/0335734 A1 | 11/2016 | Lee |
| 2017/0124678 A1 | 5/2017 | Song |

FOREIGN PATENT DOCUMENTS

| CN | 103905523 | 7/2014 |
| EP | 2930892 | 10/2015 |

OTHER PUBLICATIONS

Sherwood et al. "Can the Production Network Be the Testbed?" OSDI, vol. 10, Oct. 4, 2010, 14 pages.
(Continued)

*Primary Examiner* — Ronald B Abelson
(74) *Attorney, Agent, or Firm* — Fish & Richardson P.C.

(57) ABSTRACT

Methods, systems, and apparatus, including computer programs encoded on a computer storage medium, for switch virtualization by a switch proxy controller. In an aspect, a method includes receiving, by a switch proxy controller, a first request from a first switch fabric, where the first request indicates a first identifier that identifies the first request from other requests from the first switch fabric, generating a second request that indicates a second identifier that identifies the second request from other requests sent from the switch proxy controller to a switch, providing the second request to the switch, receiving, by the switch proxy controller, a first reply that indicates the second identifier indicated in the second request, generating, based on the second identifier indicated in the first reply, a second reply that indicates the first identifier, and selecting the first switch fabric to receive the second reply based on the second identifier.

18 Claims, 6 Drawing Sheets

Related U.S. Application Data (60) Provisional application No. 62/594,986, filed on Dec. 5, 2017.

(56) References Cited

OTHER PUBLICATIONS

Sherwood et al. "FlowVisor: A Network Virtualization Layer," Open Flow Switch Consortium, Technical Report, Oct. 14, 2009, 15 pages.
PCT International Search Report and Written Opinion issued in International Application No. PCT/US2018/064000, dated Feb. 20, 2019, 18 pages.
PCT International Preliminary Report on Patentability in International Application No. PCT/US2018/063778, dated Jun. 18, 2020, 7 pages.

SWITCH PROXY CONTROLLER FOR SWITCH VIRTUALIZATION

CROSS-REFERENCE TO RELATED APPLICATION

This application is a continuation of International Application No. PCT/US2018/064000, filed Dec. 5, 2018, which claims the benefit of U.S. Provisional Application No. 62/594,986, filed Dec. 5, 2017, and are both incorporated by reference in their entireties.

BACKGROUND

Switches may be used to route network traffic in a data center. For example, the switches may route packets from a particular Internet Protocol (IP) address to another IP address, block pockets from another particular Internet Protocol (IP), and bandwidth throttle packets from yet another particular Internet Protocol (IP) address to another IP address. These switches are generally programmed by controllers to route network traffic.

SUMMARY

This document describes techniques, methods, systems, and other mechanisms for switch virtualization by a switch proxy controller. Having multiple controllers program a switch may be desirable in datacenter operation and management. However, this presents a problem because switch controller protocols and Application Programming Interfaces (APIs) typically expect only a single master controller to program a switch. Controllers are built with the assumption that they have exclusive access to program a switch and are not designed to co-exist with other controllers simultaneously programming the switch.

A system that includes a switch proxy controller may enable multiple controllers to program a single switch. The multiple controllers may each correspond to different switch fabrics. For example, a switch may be simultaneously controlled by both a first switch fabric and a second switch fabric. A switch fabric may include multiple instances of a controller where a single instance in the switch fabric is designated as a master and is the only instance in the switch fabric that the switch permits to program the switch. The first switch fabric may refer to a first switch fabric controller and a second switch fabric may refer to a second switch fabric controller.

The switch proxy controller may cause the switch to believe that it is being controlled by a single controller designated as master in a single switch fabric, and cause each of the multiple controllers designated as a master in the different switch fabrics to believe that they have exclusive access to program the switch. In doing so, the switch proxy controller may receive requests from the multiple controllers, provide requests to the switch, and provide responses to the requests received from the switch to the respective controller that provided the request. Accordingly, the switch proxy controller may enable the switch to behave as if only a single controller were providing programming instructions even when multiple controllers are controlling the switch.

Additionally, the switch proxy controller may hide information provided by the switch so that each switch fabric is unaware of information corresponding to the other switch fabric. For example, the switch proxy controller may receive a request for active routing rules on a switch from a particular controller, provide the request to the switch, receive a list of all routing rules from the switch, identify the routing rules in the list that were programmed by the particular controller, and then provide just those routing rules that were identified to the particular controller without providing the routing rules that were programmed by other controllers.

Accordingly, the switch proxy controller may enable each of the controllers to be unaware that other controllers are also programming the switch so that each controller functions as if it had sole control of the switch. With the functionality described above, the switch proxy controller may ensure protocol version compatibility between switch fabrics and a switch, filter programming requests from the switch fabrics to prevent conflicts and resource exhaustion on the switch, and relay events from the switch to multiple switch fabric.

One innovative aspect of the subject matter described in this specification is embodied in a method that includes the actions of receiving, by a switch proxy controller, a first request from a first switch fabric, where the first request indicates a first identifier that identifies the first request from other requests from the first switch fabric, generating, by the switch proxy controller, a second request that indicates a second identifier that identifies the second request from other requests sent from the switch proxy controller to a switch, providing, by the switch proxy controller, the second request to the switch, receiving, by the switch proxy controller in response to the second request, a first reply that indicates the second identifier indicated in the second request, generating, by the switch proxy controller and based on the second identifier indicated in the first reply, a second reply that indicates the first identifier, selecting, by the switch proxy controller, the first switch fabric to receive the second reply based on the second identifier, and providing, by the switch proxy controller, the second reply to the first switch fabric.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. For instance, in some aspects generating, by the switch proxy controller and based on the second identifier indicated in the first reply, a second reply that indicates the first identifier includes determining that information in the first reply corresponds to a rule programmed by a second switch fabric and generating the second reply to not include the information in the first reply determined to correspond to the rule programmed by the second switch fabric.

In certain aspects, determining that information in the first reply that corresponds to a rule programmed by a second switch fabric includes determining that the information in the first reply that corresponds to the rule programmed by the second switch fabric indicates a rule with a number that is within a range assigned to rules from the second switch fabric. In some aspects, determining that the information in the first reply that corresponds to the rule programmed by the second switch fabric indicates a rule with a number that is within a number range assigned to rules from the second switch fabric includes receiving rule range information that indicates that rules with numbers within the number range are programmed from the second switch fabric and rules with numbers within another number range are programmed from the first switch fabric.

In some implementations, generating, by the switch proxy controller, a second request that indicates a second identifier that identifies the second request from other requests sent from the switch proxy controller to a switch includes including, in the second request, the first identifier instead of the second identifier and including, in the second request, programming instructions in the first request. In certain aspects, generating, by the switch proxy controller and based on the second identifier indicated in the first reply, a second reply that indicates the first identifier includes identifying the first identifier based on the second identifier, including, in the second reply, the first identifier instead of the second identifier, and including, in the second reply, information in the second reply request that indicates that the programming instructions were executed by the switch.

In some aspects, selecting, by the switch proxy controller, the first switch fabric to receive the second reply based on the second identifier includes identifying a particular mapping based on the second identifier and identifying the first switch fabric from the particular mapping. In certain aspects, generating, by the switch proxy controller, a second request that indicates a second identifier that identifies the second request from other requests sent from the switch proxy controller to a switch includes generating an entry in a mapping data structure where the mapping that indicates the second identifier corresponds to the first identifier and the first switch fabric, where selecting, by the switch proxy controller, the first switch fabric to receive the second reply based on the second identifier is based on the mapping and includes in response to providing, by the switch proxy controller, the second reply to the first switch fabric, removing the mapping from the mapping data structure.

In some implementations, the first identifier indicates an order of the first request in requests sent from the first switch fabric to the switch proxy controller across a connection established between the first switch fabric and the switch proxy controller, and the second identifier indicates an order of the second request in requests sent from the switch proxy controller to the switch across a connection established between the switch proxy controller and the switch.

Details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1A:
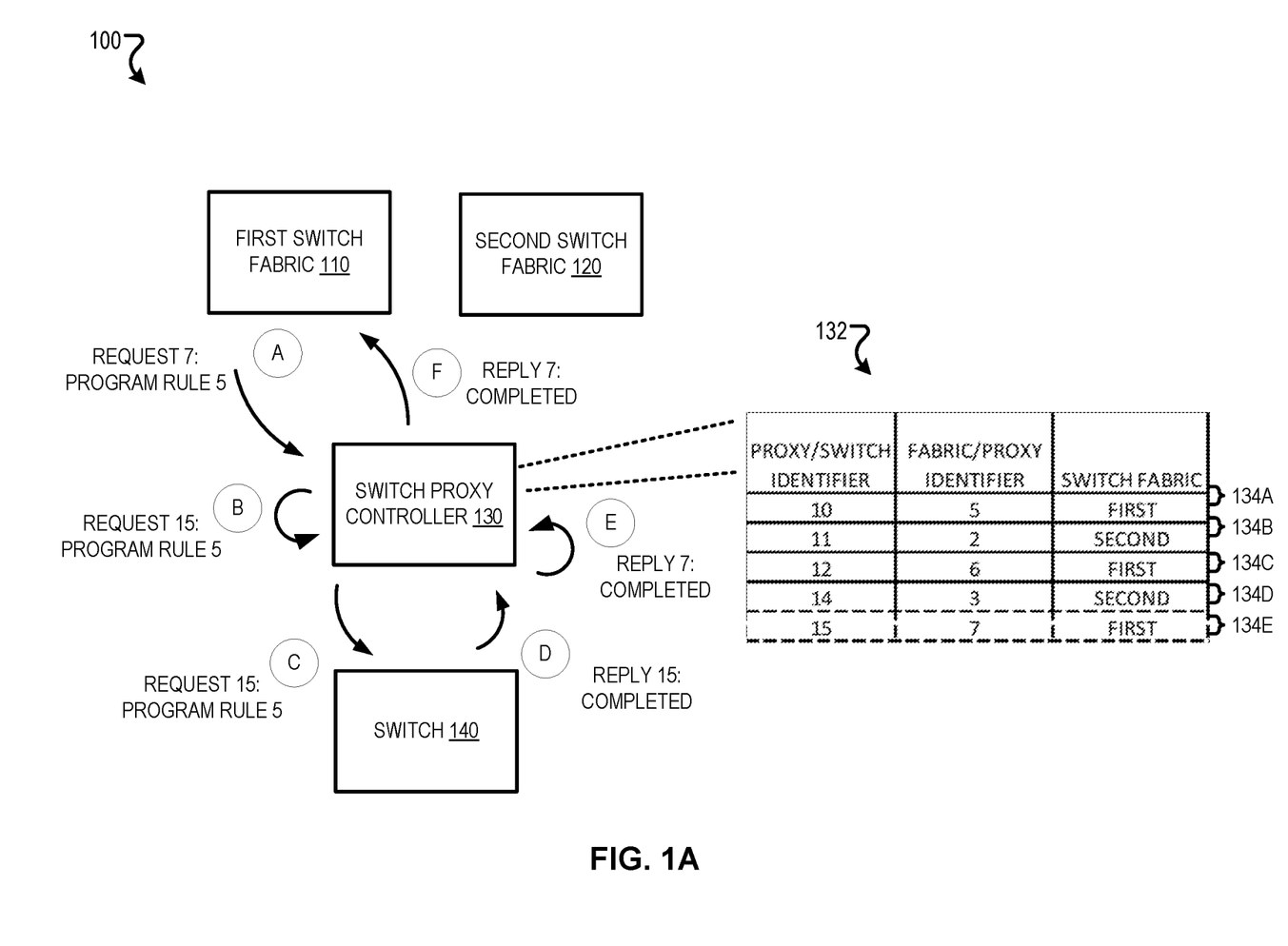
FIGS. 1A and 1B are block diagrams that illustrate an example system for switch virtualization by a switch proxy controller.
Figure 1B:
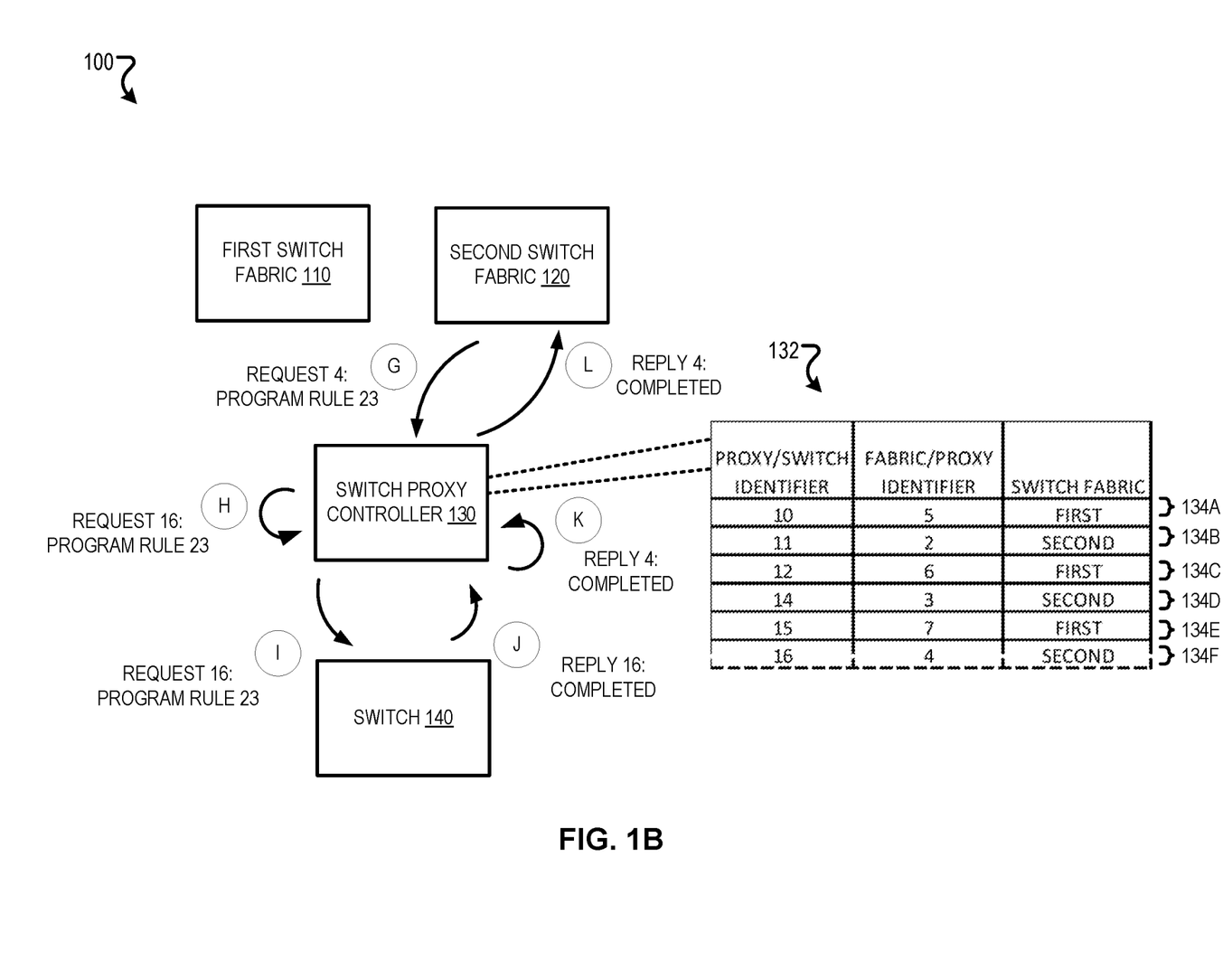

FIGS. 1A and 1B are block diagrams that illustrate an example system 100A, 100B (collectively referred to as 100) for switch virtualization by a switch proxy controller 130. The system 100 includes a first switch fabric 110, a second switch fabric 120, the switch proxy controller 130, and a switch 140. In the system, the first switch fabric 110 and second switch fabric 120 may simultaneously control the switch 140. For example, the switch 140 may apply routing rules requested by the first switch fabric 110 while also applying routing rules requested by the second switch fabric 120.

The first switch fabric 110 may include controller logic for controlling the switch 140. For example, the controller logic of the first switch fabric 110 may cause the first switch fabric 110 to output a request for the switch 140 to generate a routing rule to route packets from a particular Internet Protocol (IP) address to another IP address. In another example, the controller logic of the first switch fabric 110 may cause the first switch fabric 110 to output a request for the switch 140 to generate a routing rule to block packets from a particular Internet Protocol (IP) address.

Similarly, the second switch fabric 120 may also include controller logic for controlling the switch 140. For example, the controller logic of the second switch fabric 120 may cause the second switch fabric 120 to output a request for the switch 140 to generate a routing rule to route packets from another particular Internet Protocol (IP) address to yet another IP address.

The switch proxy controller 130 may virtualize the switch 140 so that the switch 140 is unaware it is receiving programming instructions from two different switch fabrics. Programming instructions may be requests that cause the switch 140 to generate new routing rules or modify existing routing rules. For example, the switch proxy controller 130 may appear to the switch 140 as a single switch fabric. Additionally, the switch proxy controller 130 may hide information that corresponds to a switch fabric from another switch fabric. For example, the switch proxy controller 130 may receive statistics for all networking rules and when providing the statistics to a particular switch fabric, only include the statistics for networking rules programmed by the particular switch fabric.

The switch 140 may route packets across a network in accordance with routing rules, and may generate the routing rules and modify the routing rules according to programming instructions that are received. For example, the switch 140 may receive a request that includes programming instructions to generate a routing rule to route packets from a particular Internet Protocol (IP) address to another IP address and, in response, generate and apply the routing rule.

The switch 140 may additionally or alternatively receive requests and provide replies. For example, in response to a request that includes programming instructions, the switch 140 may provide an indication that the request was completed or not completed. In another example, in response to a request for statistics on network traffic, the switch 140 may provide the statistics on network traffic.

The first switch fabric 110 may form a first connection with the switch proxy controller 130, the second switch fabric 120 may form a second connection with the switch proxy controller 130, and the switch proxy controller 130 may form a third connection between the switch 140. The first switch fabric 110 may provide requests for the switch 140 and receive replies to the requests through the first connection and the third connection. The second switch fabric 120 may provide requests for the switch 140 and receive replies to the requests through the second connection and the third connection.

Requests across each of the connections may each indicate an identifier that distinguishes the request from other requests sent across the respective connection. For example, the first switch fabric 110 may send an initial request that includes an identifier of zero, then send a next request that includes an identifier of one, and then send a next request that includes an identifier of two, etc., increasing the identifier by one for each request sent.

Similarly, for example, the second switch fabric 120 may send an initial request that includes an identifier of zero, then send a next request that includes an identifier of one, and then send a next request that includes an identifier of two, etc., increasing the identifier by one for each request sent. Also similarly, for example, the switch proxy controller 130 may send an initial request that includes an identifier of zero, then send a next request that includes an identifier of one, and then send a next request that includes an identifier of two, etc., increasing the identifier by one for each request sent.

Accordingly, the switch proxy controller 130 may receive requests with the same identifier from different switch fabrics. If the switch proxy controller 130 were to send requests with the same identifier to the switch 140, the switch 140 may raise an error as the switch 140 may be expecting each request the switch 140 receives to have a unique identifier.

Accordingly, the switch proxy controller 130 may map identifiers for requests through the first connection and the second connection to identifiers for requests through the third connection. To enable mapping, the switch proxy controller 130 may store a mapping data structure 132 that includes entries 134A-134E for each request received from the switch fabrics. Each of the entries may indicate an identifier unique for requests between a switch fabric and the switch proxy controller 130, an identifier unique for requests between the switch proxy controller 130 and the switch 140, and an indication of which switch fabric the entry corresponds.

The switch proxy controller 130 may use the entries 134A-134E to map the identifiers for requests sent through the first and second connection to identifiers for requests sent through the third connection, and also select which switch fabric to receive replies to the requests, as further described below.

FIG. 1A illustrates an example where the first switch fabric 110 provides a request for the switch 140 to generate a routing rule. Initially, the first switch fabric 110 may provide a first request to program the switch 140 (A). For example, the first switch fabric 110 may transmit to the switch proxy controller 130 a first request that includes an identifier of seven with programming instructions to program a rule with an identifier of five.

The switch proxy controller 130 may receive the request and generate a second request (B). For example, the switch proxy controller 130 may generate a second request that includes the programming instruction to program the rule identified as five, but includes an identifier of fifteen instead of an identifier of seven. In the example, the switch proxy controller 130 may use fifteen as fifteen may be the next identifier that is unused after fourteen which was used already for the entry 134D.

The switch proxy controller 130 may also create a new entry in the mapping data structure 132 that indicates (i) that the identifier fifteen included in the request sent across the connection between the switch proxy controller 130 to the switch 140 maps to the identifier seven included in the request sent across the connection between the first switch fabric 110 and the switch proxy controller 130 and (ii) that the entry corresponds to the first switch fabric 110. For example, the switch proxy controller 130 may create new entry 134E that includes value of sixteen for "proxy/switch identifier," a value of seven for "fabric/proxy identifier," and a value of first for "switch fabric."

The switch proxy controller 130 may provide the second request to the switch 140 (C). For example, the switch proxy controller 130 may provide the second request that includes the same programming instruction as the first request, but includes the identifier of fifteen instead of the identifier of seven, to the switch 140.

The switch 140 may perform actions in response to the second request and provide a first reply that includes the second identifier (D). For example, the switch 140 may generate a new rule with an identifier of five and provide a reply of "completed" that includes an identifier of fifteen.

The switch proxy controller 130 may receive the first reply from the switch 140 and generate a second reply (E). For example, the switch proxy controller 130 may generate a second reply that includes "completed" and includes an identifier of seven instead of an identifier of fifteen. In the example, the switch proxy controller 130 may include seven instead of fifteen by using the identifier of fifteen as a key to search the mapping data structure 132 and find the entry 134E that indicates that the identifier seven included in the request sent across the connection between the first switch fabric 110 and the switch proxy controller 130 corresponds to the identifier fifteen included in the request sent across the connection between the first switch fabric 110 to the switch proxy controller 130. The switch proxy controller 130 may also select the first switch fabric 110 to receive the second reply based on determining that the entry 134E indicates that the request was from the first switch fabric 110.

The switch proxy controller 130 may provide the second reply to the first switch fabric 110 (F). For example, the switch proxy controller 130 may transmit the second reply that includes "completed" and includes an identifier of seven instead of an identifier of fifteen to the first switch fabric 110.

FIG. 1B illustrates an example where the second switch fabric 120 provides a request for the switch 140 to generate a routing rule. Initially, the second switch fabric 120 may provide a first request to program the switch 140 (G). For example, the second switch fabric 120 may transmit to the switch proxy controller 130 a first request that includes an identifier of four with programming instructions to program a rule with an identifier of twenty three.

The switch proxy controller 130 may receive the request and generate a second request (H). For example, the switch proxy controller 130 may generate a second request that includes the programming instruction to program the rule identified as twenty three, but includes an identifier of sixteen instead of an identifier of four. In the example, the switch proxy controller 130 may use sixteen as sixteen may be the next identifier that is unused after fifteen which was used already for the entry 134E.

The switch proxy controller 130 may also create a new entry in the mapping data structure 132 that indicates (i) that the identifier sixteen included in the request sent across the connection between the switch proxy controller 130 to the switch 140 maps to the identifier four included in the request sent across the connection between the second switch fabric 120 and the switch proxy controller 130 and (ii) that the entry corresponds to the second switch fabric 120. For example, the switch proxy controller 130 may create new entry 134F that includes value of sixteen for "proxy/switch identifier," a value of four for "fabric/proxy identifier," and a value of second for "switch fabric."

The switch proxy controller 130 may provide the second request to the switch 140 (I). For example, the switch proxy controller 130 may provide the second request that includes the same programming instruction as the first request, but includes the identifier of sixteen instead of the identifier of four, to the switch 140.

The switch 140 may perform actions in response to the second request and provide a first reply that includes the second identifier (J). For example, the switch 140 may generate a new rule with an identifier of twenty three and provide a reply of "completed" that includes an identifier of sixteen.

The switch proxy controller 130 may receive the first reply from the switch 140 and generate a second reply (K). For example, the switch proxy controller 130 may generate a second reply that includes "completed" and includes an identifier of four instead of an identifier of sixteen. In the example, the switch proxy controller 130 may include four instead of sixteen by using the identifier of sixteen as a key to search the mapping data structure 132 and find the entry 134F that indicates that the identifier four included in the request sent across the connection between the second switch fabric 120 and the switch proxy controller 130 corresponds to the identifier sixteen included in the request sent across the connection between the second switch fabric 120 to the switch proxy controller 130. The switch proxy controller 130 may also select the second switch fabric 120 to receive the second reply based on determining that the entry 134F indicates that the request was from the second switch fabric 120.

The switch proxy controller 130 may provide the second reply to the second switch fabric 120 (L). For example, the switch proxy controller 130 may transmit the second reply that includes "completed" and includes an identifier of four instead of an identifier of sixteen to the second switch fabric 120.

Figure 2:
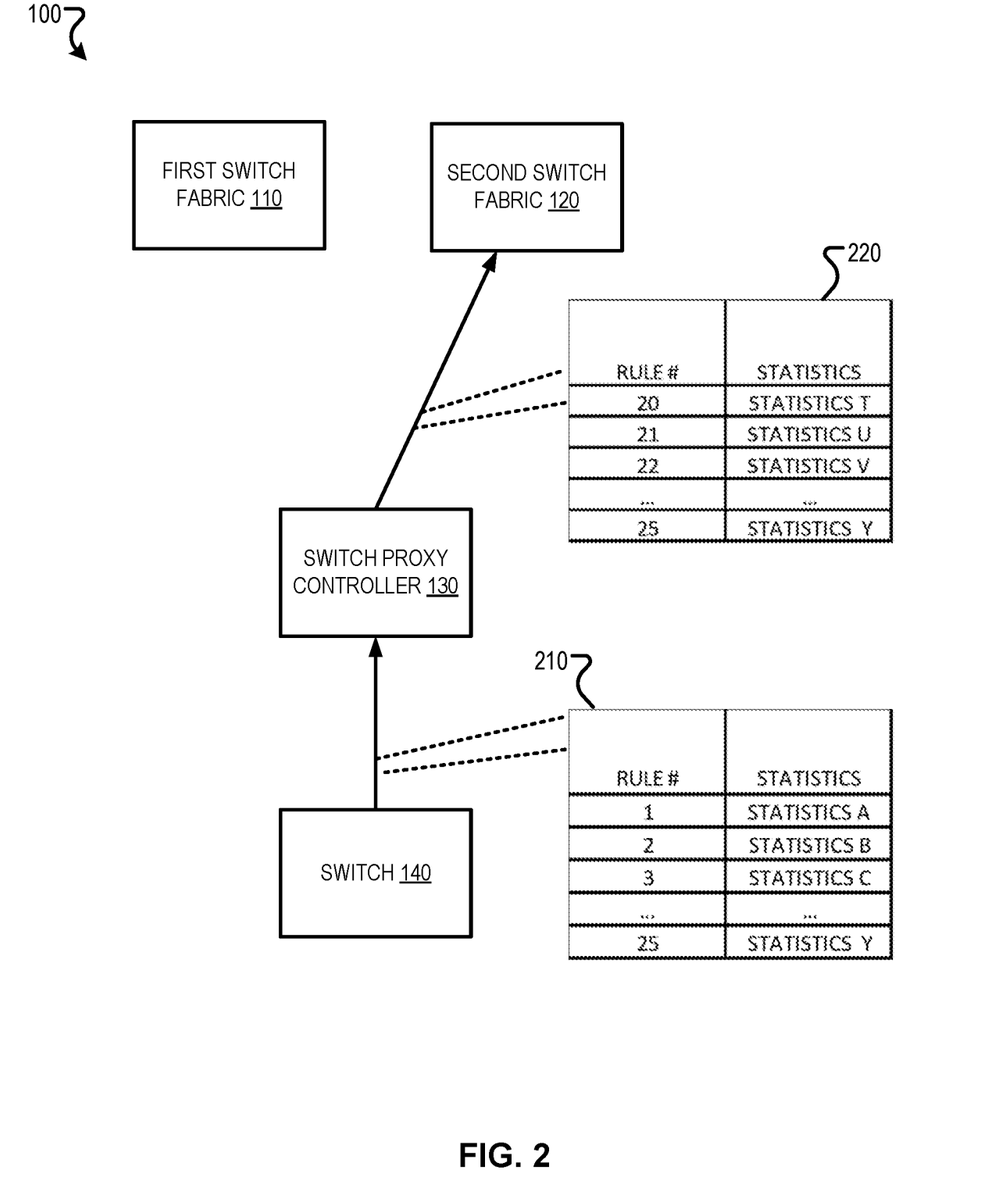
FIG. 2 is another block diagram that illustrates the example system where a switch proxy controller is hiding information corresponding to a switch fabric from another switch fabric.

FIG. 2 is another block diagram that illustrates the example system 100 where the switch proxy controller 130 is hiding information corresponding to a switch fabric from another switch fabric. For example, the switch proxy controller 130 may hide information corresponding to the first switch fabric 110 from the second switch fabric 120.

The switch proxy controller 130 may hide information corresponding to one switch fabric from another switch fabric so that the switch fabrics are unaware that other switch fabrics are also controlling the switch 140 and to prevent the switch fabrics from interfering with one another. For example, were the second switch fabric 120 to receive information indicating that the switch 140 is using a rule programmed by the first switch fabric 110, the second switch fabric 120 may determine that the rule is erroneous as the rule was not requested by the second switch fabric 120 and, in response, the second switch fabric 120 may request that the switch 140 delete the rule.

As shown in FIG. 2, requests from switch fabrics may include non-programming instructions such as requests for statistics. For example, the second switch fabric 120 may request statistics on rules being used by the switch 140. The switch proxy controller 130 may receive a first reply from the switch 140, determine information that corresponds to the second switch fabric 120, determine information that does not correspond to the second switch fabric 120, and generate a second reply so that the second reply only includes information that corresponds to the second switch fabric 120.

For example, the switch proxy controller 130 may receive a configuration file that defines that rules with identifiers between the range of one and nineteen correspond to rules for the first switch fabric 110 and rules with identifiers between the range of twenty and forty correspond to rules for the second switch fabric 120, determine that as the reply is to a request from the second switch fabric 120 only information corresponding to rules with identifiers between the range of twenty and forty should be included in the reply, identify entries that indicate rules with identifiers between twenty and forty in a table in the first reply from the switch 140, and generate the second reply to only include the entries that are identified.

Alternatively, instead of identify entries that indicate rules with identifiers between twenty and forty in a table in the first reply from the switch 140, the switch proxy controller 130 may identify entries that indicate rules with identifiers other than between twenty and forty in a table in the first reply from the switch 140 and generate the second reply by removing those entries that are identified from the first reply.

The switch proxy controller 130 may hide information from the first reply in the second reply while also using identifier for the request from the switch fabric instead of the identifier for the request from the switch proxy controller 130. For example, the switch proxy controller 130 may receive a first request with an identifier of five from the second switch fabric 120 for statistics on all rules, generate a second request with an identifier of seventeen, provide the second request to the switch 140, receive a first reply including entries for all active rules from the switch 140, generate a second reply by including only entries for rules with indicators between twenty and forty while also including an identifier of five in the second reply instead of an identifier of seventeen in the first reply, and provide the second reply to the second switch fabric 120.

Figure 3:
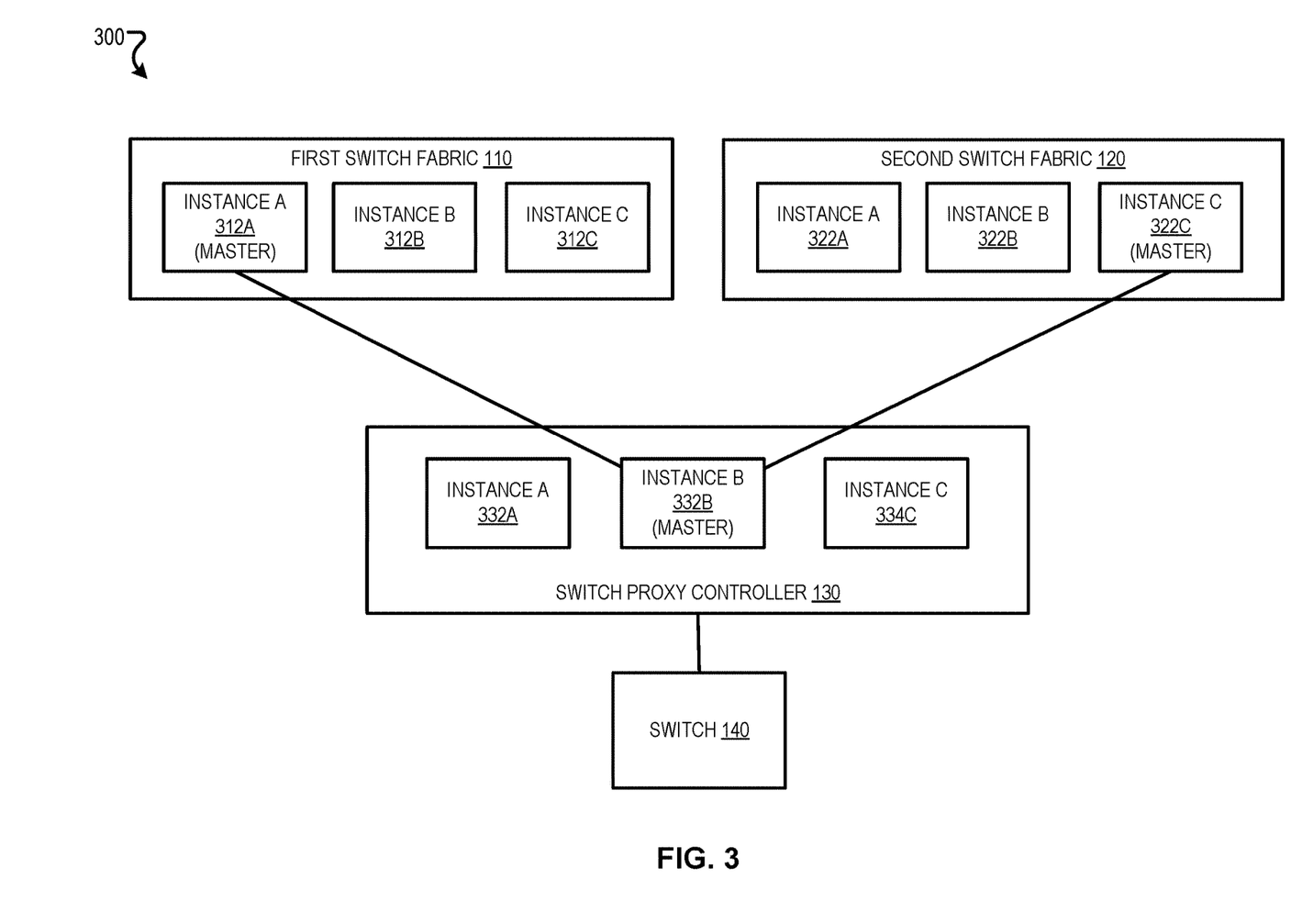
FIG. 3 is a block diagram that illustrates an example system that includes multiple instances of a controller for each switch fabric and multiple instances of a switch proxy controller.

FIG. 3 is a block diagram that illustrates an example system 300 that includes multiple instances 312A-C and 322A-C of a controller for each switch fabric 110, 120 and multiple instances 332A-C of a switch proxy controller 130. The multiple instances may be included for redundancy purposes. For example, only a single instance from the switch fabric 110 may provide programming instructions at a time but were the instance to fail, another instance would then be designated as a master.

As shown in FIG. 3, instance A 312A from the first switch fabric 110 may be designated as a master that may provide programming instructions for the switch 140, instance C 32CA from the second switch fabric 120 may be designated as a master that may provide programming instructions for the switch 140, and instance B 332B from the switch proxy controller 130 may be designated as a master that may provide programming instructions to the switch 140.

Instances within each of the switch fabrics 110, 120, and switch proxy controller 130 may be designated as master based on various approaches. For example, a leader election algorithm may be used to select a master. In some cases, multiple instances in the switch fabrics 110, 120 may think that they are masters and initiate role requests for mastership. The switch proxy controller 130 may resolve such claims.

To do so, the switch proxy controller 130 may treat instances of the switch fabrics 110, 120 to belong to two different switch fabrics and perform tie-breaking within each switch fabric. For this, the switch proxy controller 130 may follow a protocol as a regular switch, e.g., starting each instance in a slave role and requiring that each instance of the switch fabric request a master role, reset roles for instances on each connection reset, and tie-break using a generation identifier when mastership disputes arise within a switch fabric. A generation identifier may be assigned to an instance each time the instance is designated as a master, where the generation identifier is increased for the switch fabric each time a new instance is designated. Accordingly, role requests from the instances of the switch fabrics may be handled by the switch proxy controller 130 instead of the switch 140.

Also, following the behavior of a regular switch, the switch proxy controller 130 may forward or deny requests based on the request type and the requesting instance's mastership status. For example, the switch proxy controller 130 may only allow requests that include programming instructions from an instance that is a master but allow requests that do not include programming instructions, e.g., requests for statistics, from all instances. This may be important because while the switch 140 may execute or deny the requests based on the requester's mastership status, a request forwarded by the switch proxy controller 130 may result in an executed request at the switch 140, since from the switch's 140 perspective, the switch proxy controller 130 may be a master instance of a switch fabric.

Generally, an instance of the switch proxy controller 130 may wait until it is announced that that the instance has become master, send to each switch a role request for the master role, and wait for a switch role reply acknowledging it as master, initiate connections to the instances of the switch fabrics 110, 120, and drop the connections if the conditions leading up to initiating connections are no longer fulfilled. In some implementations, the switch proxy controller 130 may use a generation identifier for the switch proxy controller 130 for those connection and not receive an explicit mastership acknowledgment. An instance of the switch fabrics 110, 120 may close or not open a connection if the generation identifier is not sufficiently high or if later the instance receives a connection request with a higher generation identifier. An instance of a switch fabric may tie-break connections in a case of a master change between instances 332-332C in the switch proxy controller 130.

In some implementations, in case of a master change in the switch proxy controller 130, e.g., due to a master losing its connection, the new master may try to take over the switch 140 and open connections to the instances 312A-C, 322A-C of the switch fabrics 110, 120. This may present two challenges. First, the switch 140 may be presented with two instances of the switch proxy controller 130 claiming mastership. This may be overcome with the switch 140 using the regular tie-breaking, e.g., the switch 140 may select the instance of the switch proxy controller 130 that reports a higher generation identifier.

Second, instances 312A-C, 322A-C of the switch fabrics 110, 120 may receive multiple connections with same switch identifier. While a master instance of the switch proxy controller 130 may open connections to each of the instances 312A-C, 322A-C of the switch fabrics 110, 120, a mastership change may potentially result in a transient period with dual masters or multiple instances of the switch proxy controller 130 consider themselves masters for another reason. The switch fabrics 110, 120 may be presented with two or more connections claiming to represent the same switch identifier. The switch 140 may not inform the previous master of its status change even if the connection to that instance is still available so the previous master may be unaware there is a new master.

Accordingly, the instances of the switch proxy controller 130 may transmit a generation identifier with a request to initiate a connection. For example, the switch fabrics 110, 120 may receive requests to initiate connections with a generation identifier with the HELLO message of a new connection initiated by the instance of the switch proxy controller 130. This generation identifier may be identical to the generation identifier that is sent by the instance of the switch proxy controller 130 to the switch 140 as part of the role request from the instances of the switch proxy controller 130.

The receiving instance of the switch fabrics 110, 120 may tear down an existing connection for a particular switch identifier if a new connection initiation request with a higher generation identifier is received. This may ensure that the switch 140 and switch fabrics 110, 120 agree on the instance of the switch proxy controller 130 to be used to relay requests to the switch 140.

The switch proxy controller 130 may be used during migration of control from a first switch fabric to a second switch fabric where both switch fabrics control a same switch. Accordingly, before and after the migration, control may be done by only a single one of the switch fabrics so the instances of the switch fabric with control may directly connect with the switch 140 and the switch proxy controller 130 may not be needed.

Accordingly, as there may not be tie-breaks between instances of switch proxy controller 130 when the switch proxy controller 130 is not being used, the requests to initiate connections received by the switch fabrics may not include generation identifiers. When the switch proxy controller 130 is first introduced in, the switch fabrics may prefer connections with a higher generation identifier. After the switch proxy controller 130 is no longer needed, the switch fabrics may prefer connections without a generation identifier. Accordingly, the system 300 may include a configuration attribute in the switch fabrics that indicate whether to prefer connections with a generation identifier over connections without a generation identifier.

In some implementations, the configuration attribute may be "bool prefer_ofa_channel_with_gen_id" where before migration, the value for "prefer_ofa_channel_with_gen_id"=false, and the switch fabrics reject connections if they see generation identifiers in the HELLO message.

When migration is initiated, a configuration may be pushed to the switch fabrics to change "prefer_ofa_channel_with_gen_id"=true. This may cause the switch fabrics to prefer the connections with higher generation identifier in the HELLO message. The preference may come into play if the switch fabrics sees two connections for same switch identifier. Possibilities are as follows: if connection 1 has generation identifier (genID) in HELLO, prefer connection 1, if connection 1 does not have genID in HELLO, prefer connection 1, if connection 1 does not have genID in HELLO and prefer connection 2 has genID>0 in HELLO, prefer connection 2, and if connection 1 has genID in HELLO and connection 2 has genID>genID in HELLO, prefer connection 2. When migration is initiated, a configuration may also be pushed to the switch 140 to connect to the switch proxy controller 130 instead of the switch fabrics 110, 120.

After migration is completed, a configuration may be pushed to the switch fabrics 110, 120 with "prefer_ofa_channel_with_gen_id=false." With this the preference at the switch fabrics may become as follows: if connection 1 has genID in HELLO, prefer connection 1, if connection 1 does not have genID in HELLO, prefer connection 1, if connection 1 does not have genID in HELLO and connection 2 has genID >0 in HELLO, prefer connection 1, and if connection 1 has genID1 in HELLO and connection 2 has genID2 >genID1 in HELLO, prefer connection 2.

In some cases, a genID for an instance of the switch proxy controller 130 may increment without mastership change. For example, if an instance that is a master temporarily loses mastership and resumes mastership later on, it may receive two back-to-back notifications that it holds mastership with different increasing gen IDs. Similarly, there may be manual intervention to increment the genID or another instance of the switch proxy controller 130 might have assumed mastership in the meanwhile and initiated connections with an intermediate genID to the switch fabrics 110, 120. Accordingly, an instance of the switch proxy controller 130 that is delegated as master may always re-establish connections upon every genID change using the latest genID.

As a summary for migration to roll forward from the first switch fabric 110 to the second switch fabric 120, the switch fabrics may be configured with "prefer_ofa_channel_with_gen_id"=false, a triplet of instances of switch proxy controller 130 may deployed for each domain that needs to be managed in parallel by the switch fabrics 110, 120, the instances of the switch proxy controller 130 may be configured to relay to the switch fabrics 110, 120. An epoch identifier for the instances of the switch proxy controller 130 ID may be used that is larger than that of both switch fabrics 110, 120. The switch fabrics 110, 120 may be configured with "prefer_ofa_channel_with_gen_id"=true.

A new switch configuration may be created to connect the switches to the switch proxy controller 130. The configuration may be gradually rolled out to the switch fabrics 110, 120. This configuration push may result in connections from the first switch fabric 110 being torn down and new connections to the switch proxy controller 130 being established. The switch proxy controller 130 may then proceed to establish connections to both the switch fabrics 110, 120, where "prefer_ofa_channel_with_gen_id=true" ensures that any lingering direct connections at the first switch fabric 110 are torn down when a connection via the switch proxy controller 130 arrives. The switch proxy controller 130 may stage the rollout of configuration to the switches and verify new connections being established. The switch proxy controller 130 may wait for a configuration push to complete to the entire fabric before proceeding to the next step.

At this point, both switch fabrics 110, 120 may have control paths to the switches through the switch proxy controller 130, and migration may be performed. After migration is performed, the switch fabrics 110, 120 may be configured with "prefer_ofa_channel_with_gen_id =false." A new switch configuration may be created to connect the switches directly to the second switch fabric 120. The configuration may be gradually rolled out to the fabric.

This configuration push may result in connections from the switch proxy controller 130 being torn down, and new direct connections to the second switch fabric 120. "prefer_ofa_channel_with_gen_id"=false may ensure that the second switch fabric 120 tears down any lingering connections from the switch proxy controller 130. Once the configuration push is completed, the switch proxy controller 130 may no longer be in the path of connections between the switch fabrics 110, 120 and the switches, and may be safely torn down.

To rollback while to the first switch fabric 110 while both switch fabrics 110, 120 have control, the switch fabrics 110, 120 may be configured with "prefer_ofa_channel_with_gen_id =false." A new switch configuration is created to connect the switches directly to the first switch fabric 110. The configuration is rolled out to the fabric, which causes the switches to tear down connections with the switch proxy controller 130 and establish connections directly to first switch fabric 110, the switch proxy controller 130 may be removed and any connections with the second fabric 120 may be removed from the switches.

In some implementations, the switch proxy controller 130 may inspect requests to ensure that they will not cause a conflict at the switch 140. For example, the switch proxy controller 130 may determine that a new rule requested by the second switch fabric 120 is in direct conflict with a rule programmed by the first switch fabric 110 and return an error the second switch fabric 120 indicating that the new rule cannot be programmed. In some implementations, the switch proxy controller 130 may relay events received from the switch 140 to all instances 312A-C and 322A-C of the switch fabrics 110, 120.

In some implementations, if the instance of the switch proxy controller 130 designated as master is unable to connect to any of the instances of the switch fabrics 110, 120, the switch proxy controller 130 may continue to periodically retry. In some implementations, the control protocol between the switch 140 and the switch fabrics 110, 120 may be based on the Openflow standards https://www.opennetworking.org/software-defined-standards/specifications/, and the switch fabrics 110, 120 may use different protocols. For example, the first switch fabric 110 may use a different version of the Openflow standards than the second switch fabric 120. The switch 140 may be a hardware or a software switch and the switch proxy controller 130 may serve multiple switches.

Figure 4:
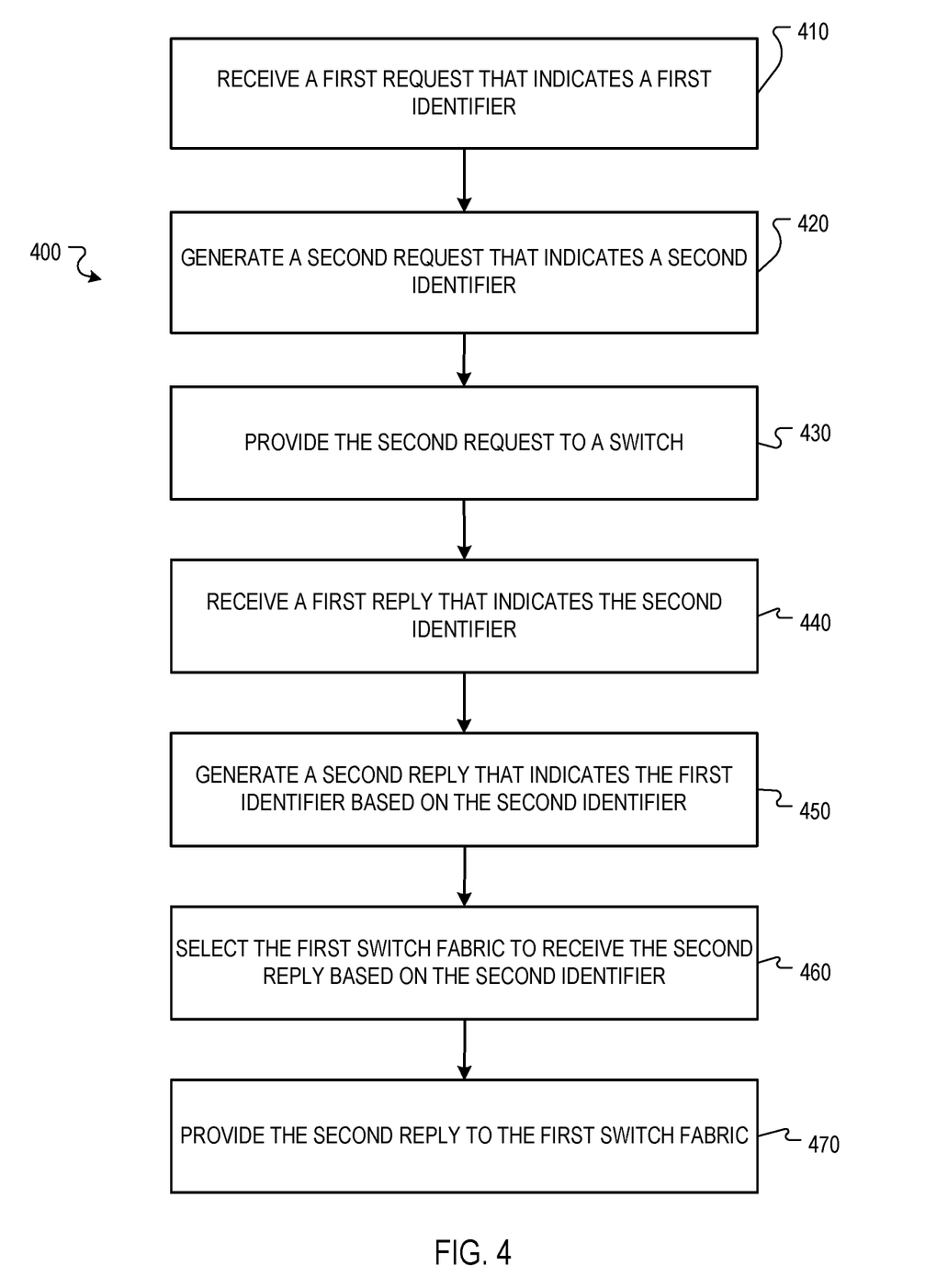
FIG. 4 is a flow diagram that illustrates an example of a process for switch virtualization by a switch proxy controller.

FIG. 4 is a flow diagram that illustrates an example of a process 400 for switch virtualization by a switch proxy controller. The operations of the process 400 may be performed by system 100 or other systems.

The process 400 may include receiving a first request that indicates a first identifier (410). For example, the switch proxy controller 130 may receive a request from the first switch fabric 110 that indicates an identifier of seven and includes programming instructions for a rule with an identifier of five.

The process 400 may include generating a second request that indicates a second identifier (420). For example, the switch proxy controller 130 may generate a second request that indicates an identifier of fifteen and includes the programming instructions for the rule with an identifier of five.

In some implementations, generating a second request that indicates a second identifier includes including, in the second request, the first identifier instead of the second identifier and including, in the second request, programming instructions in the first request. For example, the switch proxy controller 130 may include in the second request the identifier of fifteen instead of five while including the same programming instructions for the rule with the identifier of five as in the first request.

The process 400 may include providing the second request to a switch (430). For example, the switch proxy controller 130 may provide the second request to the switch 140.

The process 400 may include receiving a first reply that indicates the second identifier (440). For example, the switch proxy controller 130 may receive a reply with an identifier of fifteen and a message of "completed."

The process 400 may include generating a second reply that indicates the first identifier based on the second identifier (450). For example, the switch proxy controller 130 may generate a reply that indicates an identifier of seven and "completed."

In some implementations, generating the second request may include determining that information in the first reply corresponds to a rule programmed by a second switch fabric and generating the second reply to not include the information in the first reply determined to correspond to the rule programmed by the second switch fabric. For example, the switch proxy controller 130 may receive a reply that includes statistics for all rules and determine that entries for rules with identifiers of twenty through twenty five correspond to the second switch fabric 120 and generate a reply that includes the entries for the rules with identifiers of twenty through twenty five and does not include entries for rules with other identifiers.

In some implementations, determining that information in the first reply that corresponds to a rule programmed by a second switch fabric includes determining that the information in the first reply that corresponds to the rule programmed by the second switch fabric indicates a rule with a number that is within a range assigned to rules from the second switch fabric. For example, the switch proxy controller 130 may determine that the entry with the identifier of twenty for the rule falls within a range of twenty to forty assigned to the second switch fabric 120.

In some implementations, determining that the information in the first reply that corresponds to the rule programmed by the second switch fabric indicates a rule with a number that is within a number range assigned to rules from the second switch fabric includes receiving rule range information that indicates that rules with numbers within the number range are programmed from the second switch fabric and rules with numbers within another number range are programmed from the first switch fabric. For example, the switch proxy controller 130 may receive configuration information that indicates that the first switch fabric 110 will use rules with identifiers between one and nineteen and the second switch fabric 120 will use rules with identifiers between twenty and twenty five. The configuration information may be received by the switch proxy controller 130 before the switch proxy controller 130 receives any replies from the switch 140. For example, when the switch proxy controller 130 is initiated.

In some implementations, generating, by the switch proxy controller and based on the second identifier indicated in the first reply, a second reply that indicates the first identifier includes identifying the first identifier based on the second identifier, including, in the second reply, the first identifier instead of the second identifier, and including, in the second reply, information in the second reply request that indicates that the programming instructions were executed by the switch. For example, the switch proxy controller 130 may generate a reply that includes "completed" and the identifier of seven instead of the identifier of fifteen.

The process 400 may include selecting the first switch fabric to receive the second reply based on the second identifier (460). For example, the switch proxy controller 130 may select the first switch fabric 110 to receive the second reply.

In some implementations, selecting the first switch fabric to receive the second reply based on the second identifier includes identifying a particular mapping based on the second identifier and identifying the first switch fabric from the particular mapping. For example, the switch proxy controller 130 may determine that the entry 134E indicates that a reply with the identifier of fifteen was received from the first switch fabric 110 so should be routed back to the first switch fabric 110.

The process 400 may include providing the second reply to the first switch fabric (470). For example, the switch proxy controller 130 may transmit the second reply to the first switch fabric 110.

In some implementations, generating, by the switch proxy controller, a second request that indicates a second identifier that identifies the second request from other requests sent from the switch proxy controller to a switch includes generating an entry in a mapping data structure where the mapping that indicates the second identifier corresponds to the first identifier and the first switch fabric, selecting, by the switch proxy controller, the first switch fabric to receive the second reply based on the second identifier is based on the mapping, and the process 400 includes in response to providing, by the switch proxy controller, the second reply to the first switch fabric, removing the mapping from the mapping data structure. For example, the switch proxy controller 130 may generate the entry 134E in the mapping data structure 132 in response to receiving the first request, then select the first switch fabric 110 based on the entry 134E, and then remove the entry 134E from the mapping data structure 132 as the entry 134E may no longer be needed.

In some implementations, the first identifier indicates an order of the first request in requests sent from the first switch fabric to the switch proxy controller across a connection established between the first switch fabric and the switch proxy controller, and the second identifier indicates an order of the second request in requests sent from the switch proxy controller to the switch across a connection established between the switch proxy controller and the switch. For example, the first switch fabric 110 may increment identifiers for requests that the first switch fabric 110 sends, the second switch fabric 120 may increment identifiers for requests that the second switch fabric 120 sends, and the switch proxy controller 130 may increment identifiers for requests that the switch proxy controller 130 sends.

Figure 5:
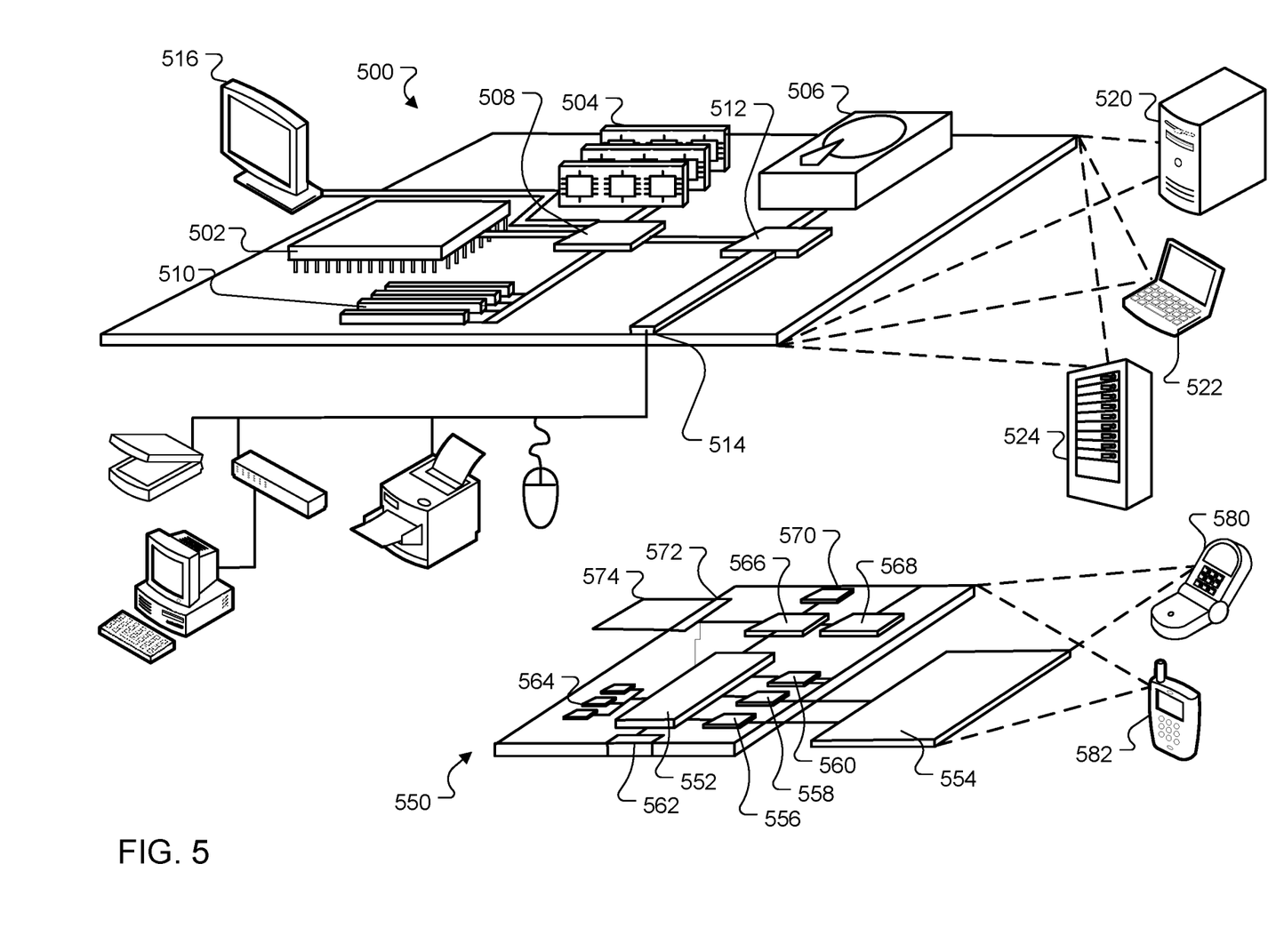
FIG. 5 is a block diagram of examples of computing devices that may be used to implement the systems and methods described in this document.

FIG. 5 shows an example of a computing device 500 and a mobile computing device 550 that can be used to implement the techniques described here. The computing device 500 is intended to represent various forms of digital computers, such as laptops, desktops, workstations, personal digital assistants, servers, blade servers, mainframes, and other appropriate computers. The mobile computing device 550 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 500 includes a processor 502, a memory 504, a storage device 506, a high-speed interface 508 connecting to the memory 504 and multiple high-speed expansion ports 510, and a low-speed interface 512 connecting to a low-speed expansion port 514 and the storage device 506. Each of the processor 502, the memory 504, the storage device 506, the high-speed interface 508, the high-speed expansion ports 510, and the low-speed interface 512, are interconnected using various busses, and may be mounted on a common motherboard or in other manners as appropriate. The processor 502 can process instructions for execution within the computing device 500, including instructions stored in the memory 504 or on the storage device 506 to display graphical information for a graphical user interface (GUI) on an external input/output device, such as a display 516 coupled to the high-speed interface 508. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 504 stores information within the computing device 500. In some implementations, the memory 504 is a volatile memory unit or units. In some implementations, the memory 504 is a non-volatile memory unit or units. The memory 504 may also be another form of computer-readable medium, such as a magnetic or optical disk.

The storage device 506 is capable of providing mass storage for the computing device 500. In some implementations, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 502), perform one or more methods, such as those described above. The instructions can also be stored by one or more storage devices such as computer- or machine-readable mediums (for example, the memory 504, the storage device 506, or memory on the processor 502).

The high-speed interface 508 manages bandwidth-intensive operations for the computing device 500, while the low-speed interface 512 manages lower bandwidth-intensive operations. Such allocation of functions is an example only. In some implementations, the high-speed interface 508 is coupled to the memory 504, the display 516 (e.g., through a graphics processor or accelerator), and to the high-speed expansion ports 510, which may accept various expansion cards (not shown). In the implementation, the low-speed interface 512 is coupled to the storage device 506 and the low-speed expansion port 514. The low-speed expansion port 514, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. In addition, it may be implemented in a personal computer such as a laptop computer 522. It may also be implemented as part of a rack server system 524. Alternatively, components from the computing device 500 may be combined with other components in a mobile device (not shown), such as a mobile computing device 550. Each of such devices may contain one or more of the computing device 500 and the mobile computing device 550, and an entire system may be made up of multiple computing devices communicating with each other.

The mobile computing device 550 includes a processor 552, a memory 564, an input/output device such as a display 554, a communication interface 566, and a transceiver 568, among other components. The mobile computing device 550 may also be provided with a storage device, such as a micro-drive or other device, to provide additional storage. Each of the processor 552, the memory 564, the display 554, the communication interface 566, and the transceiver 568, are interconnected using various buses, and several of the components may be mounted on a common motherboard or in other manners as appropriate.

The processor 552 can execute instructions within the mobile computing device 550, including instructions stored in the memory 564. The processor 552 may be implemented as a chipset of chips that include separate and multiple analog and digital processors. The processor 552 may provide, for example, for coordination of the other components of the mobile computing device 550, such as control of user interfaces, applications run by the mobile computing device 550, and wireless communication by the mobile computing device 550.

The processor 552 may communicate with a user through a control interface 558 and a display interface 556 coupled to the display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may provide communication with the processor 552, so as to enable near area communication of the mobile computing device 550 with other devices. The external interface 562 may provide, for example, for wired communication in some implementations, or for wireless communication in other implementations, and multiple interfaces may also be used.

The memory 564 stores information within the mobile computing device 550. The memory 564 can be implemented as one or more of a computer-readable medium or media, a volatile memory unit or units, or a non-volatile memory unit or units. An expansion memory 574 may also be provided and connected to the mobile computing device 550 through an expansion interface 572, which may include, for example, a SIMM (Single In Line Memory Module) card interface. The expansion memory 574 may provide extra storage space for the mobile computing device 550, or may also store applications or other information for the mobile computing device 550. Specifically, the expansion memory 574 may include instructions to carry out or supplement the processes described above, and may include secure information also. Thus, for example, the expansion memory 574 may be provided as a security module for the mobile computing device 550, and may be programmed with instructions that permit secure use of the mobile computing device 550. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier that the instructions, when executed by one or more processing devices (for example, processor 552), perform one or more methods, such as those described above. The instructions can also be stored by one or more storage devices, such as one or more computer- or machine-readable mediums (for example, the memory 564, the expansion memory 574, or memory on the processor 552). In some implementations, the instructions can be received in a propagated signal, for example, over the transceiver 568 or the external interface 562.

The mobile computing device 550 may communicate wirelessly through the communication interface 566, which may include digital signal processing circuitry where necessary. The communication interface 566 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 568 using a radio-frequency. In addition, short-range communication may occur, such as using a Bluetooth, WiFi, or other such transceiver (not shown). In addition, a GPS (Global Positioning System) receiver module 570 may provide additional navigation- and location-related wireless data to the mobile computing device 550, which may be used as appropriate by applications running on the mobile computing device 550.

The mobile computing device 550 may also communicate audibly using an audio codec 560, which may receive spoken information from a user and convert it to usable digital information. The audio codec 560 may likewise generate audible sound for a user, such as through a speaker, e.g., in a handset of the mobile computing device 550. Such sound may include sound from voice telephone calls, may include recorded sound (e.g., voice messages, music files, etc.) and may also include sound generated by applications operating on the mobile computing device 550.

The mobile computing device 550 may be implemented in a number of different forms, as shown in the figure. For example, it may be implemented as a cellular telephone 580. It may also be implemented as part of a smart-phone 582, personal digital assistant, or other similar mobile device.

Various implementations of the systems and techniques described here can be realized in digital electronic circuitry, integrated circuitry, specially designed ASICs, computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and can be implemented in a high-level procedural and/or object-oriented programming language, and/or in assembly/machine language. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used herein, the terms "machine-readable medium" and "computer-readable medium" refers to any computer program product, apparatus and/or device, e.g., magnetic discs, optical disks, memory, Programmable Logic devices (PLDs) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back end component, e.g., as a data server, or that includes a middleware component such as an application server, or that includes a front end component such as a client computer having a graphical user interface or a Web browser through which a user can interact with an implementation of the systems and techniques described here, or any combination of such back end, middleware, or front end components. The components of the system can be interconnected by any form or medium of digital data communication such as, a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed.

For example, in some embodiments, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

A number of embodiments have been described. Nevertheless, it will be understood that various modifications may be made without departing from the scope of the invention. For example, various forms of the flows shown above may be used, with steps re-ordered, added, or removed. Also, although several applications of the systems and methods have been described, it should be recognized that numerous other applications are contemplated. Accordingly, other embodiments are within the scope of the following claims.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method, comprising:
    receiving, by a switch proxy controller, a first request from a first switch fabric, where the first request indicates a first identifier that identifies the first request from other requests from the first switch fabric;
    generating, by the switch proxy controller, a second request that indicates a second identifier that identifies the second request from other requests sent from the switch proxy controller to a switch;
    providing, by the switch proxy controller, the second request to the switch;
    receiving, by the switch proxy controller in response to the second request, a first reply that indicates the second identifier indicated in the second request;
    determining, by the switch proxy controller, that information in the first reply corresponds to a rule programmed by a second switch fabric;
    generating, by the switch proxy controller and based on the second identifier indicated in the first reply, a second reply that indicates the first identifier and that does not include the information in the first reply determined to correspond to the rule programmed by the second switch fabric;
    selecting, by the switch proxy controller, the first switch fabric to receive the second reply based on the second identifier; and
    providing, by the switch proxy controller, the second reply to the first switch fabric.

2. The method of claim 1, wherein determining that information in the first reply corresponds to a rule programmed by a second switch fabric comprises:
    determining that the information in the first reply that corresponds to the rule programmed by the second switch fabric indicates a rule with a number that is within a range assigned to rules from the second switch fabric.

3. The method of claim 2, wherein determining that the information in the first reply that corresponds to the rule programmed by the second switch fabric indicates a rule with a number that is within a number range assigned to rules from the second switch fabric comprises:
    receiving rule range information that indicates that rules with numbers within the number range are programmed from the second switch fabric and rules with numbers within another number range are programmed from the first switch fabric.

4. The method of claim 1, wherein generating, by the switch proxy controller, a second request that indicates a second identifier that identifies the second request from other requests sent from the switch proxy controller to a switch comprises:
    including, in the second request, the first identifier instead of the second identifier; and
    including, in the second request, programming instructions in the first request.

5. The method of claim 1, wherein generating, by the switch proxy controller and based on the second identifier indicated in the first reply, a second reply that indicates the first identifier and that does not include the information in the first reply determined to correspond to the rule programmed by the second switch fabric comprises:
    identifying the first identifier based on the second identifier;
    including, in the second reply, the first identifier instead of the second identifier; and
    including, in the second reply, information in the first reply that indicates that programming instructions were executed by the switch.

6. The method of claim 1, wherein selecting, by the switch proxy controller, the first switch fabric to receive the second reply based on the second identifier comprises:
    identifying a particular mapping based on the second identifier; and
    identifying the first switch fabric from the particular mapping.

7. The method of claim 1, wherein generating, by the switch proxy controller, a second request that indicates a second identifier that identifies the second request from other requests sent from the switch proxy controller to a switch comprises:
    generating an entry in a mapping data structure where the mapping that indicates the second identifier corresponds to the first identifier and the first switch fabric, wherein selecting, by the switch proxy controller, the first switch fabric to receive the second reply based on the second identifier is based on the mapping; and
    the method comprises:
        in response to providing, by the switch proxy controller, the second reply to the first switch fabric, removing the mapping from the mapping data structure.

8. The method of claim 1, wherein the first identifier indicates an order of the first request in requests sent from the first switch fabric to the switch proxy controller across a connection established between the first switch fabric and the switch proxy controller, and the second identifier indicates an order of the second request in requests sent from the switch proxy controller to the switch across a connection established between the switch proxy controller and the switch.

9. A system comprising:
    one or more computers and one or more storage devices storing instructions that are operable, when executed by the one or more computers, to cause the one or more computers to perform operations comprising:
        receiving, by a switch proxy controller, a first request from a first switch fabric, where the first request indicates a first identifier that identifies the first request from other requests from the first switch fabric;
        generating, by the switch proxy controller, a second request that indicates a second identifier that identifies the second request from other requests sent from the switch proxy controller to a switch, comprising:
including, in the second request, the first identifier instead of the second identifier; and
including, in the second request, programming instructions in the first request;
providing, by the switch proxy controller, the second request to the switch;
receiving, by the switch proxy controller in response to the second request, a first reply that indicates the second identifier indicated in the second request;
generating, by the switch proxy controller and based on the second identifier indicated in the first reply, a second reply that indicates the first identifier;
selecting, by the switch proxy controller, the first switch fabric to receive the second reply based on the second identifier; and
providing, by the switch proxy controller, the second reply to the first switch fabric.

10. The system of claim 9, wherein generating, by the switch proxy controller and based on the second identifier indicated in the first reply, a second reply that indicates the first identifier comprises:
determining that information in the first reply corresponds to a rule programmed by a second switch fabric; and
generating the second reply to not include the information in the first reply determined to correspond to the rule programmed by the second switch fabric.

11. The system of claim 10, wherein determining that information in the first reply corresponds to a rule programmed by a second switch fabric comprises:
determining that the information in the first reply that corresponds to the rule programmed by the second switch fabric indicates a rule with a number that is within a range assigned to rules from the second switch fabric.

12. The system of claim 11, wherein determining that the information in the first reply that corresponds to the rule programmed by the second switch fabric indicates a rule with a number that is within a number range assigned to rules from the second switch fabric comprises:
receiving rule range information that indicates that rules with numbers within the number range are programmed from the second switch fabric and rules with numbers within another number range are programmed from the first switch fabric.

13. The system of claim 9, wherein generating, by the switch proxy controller and based on the second identifier indicated in the first reply, a second reply that indicates the first identifier comprises:
identifying the first identifier based on the second identifier;
including, in the second reply, the first identifier instead of the second identifier; and
including, in the second reply, information in the first reply that indicates that the programming instructions were executed by the switch.

14. The system of claim 9, wherein selecting, by the switch proxy controller, the first switch fabric to receive the second reply based on the second identifier comprises:
identifying a particular mapping based on the second identifier; and
identifying the first switch fabric from the particular mapping.

15. The system of claim 9, wherein generating, by the switch proxy controller, a second request that indicates a second identifier that identifies the second request from other requests sent from the switch proxy controller to a switch comprises:
generating an entry in a mapping data structure where the mapping that indicates the second identifier corresponds to the first identifier and the first switch fabric,
wherein selecting, by the switch proxy controller, the first switch fabric to receive the second reply based on the second identifier is based on the mapping; and
the operations comprise:
in response to providing, by the switch proxy controller, the second reply to the first switch fabric, removing the mapping from the mapping data structure.

16. The system of claim 9, wherein the first identifier indicates an order of the first request in requests sent from the first switch fabric to the switch proxy controller across a connection established between the first switch fabric and the switch proxy controller, and the second identifier indicates an order of the second request in requests sent from the switch proxy controller to the switch across a connection established between the switch proxy controller and the switch.

17. A non-transitory computer-readable medium storing instructions executable by one or more computers which, upon such execution, cause the one or more computers to perform operations comprising:
receiving, by a switch proxy controller, a first request from a first switch fabric, where the first request indicates a first identifier that identifies the first request from other requests from the first switch fabric;
generating, by the switch proxy controller, a second request that indicates a second identifier that identifies the second request from other requests sent from the switch proxy controller to a switch;
providing, by the switch proxy controller, the second request to the switch;
receiving, by the switch proxy controller in response to the second request, a first reply that indicates the second identifier indicated in the second request;
generating, by the switch proxy controller and based on the second identifier indicated in the first reply, a second reply that indicates the first identifier;
selecting, by the switch proxy controller, the first switch fabric to receive the second reply based on the second identifier, comprising:
identifying a particular mapping based on the second identifier; and
identifying the first switch fabric from the particular mapping; and
providing, by the switch proxy controller, the second reply to the first switch fabric.

18. The medium of claim 17, wherein generating, by the switch proxy controller and based on the second identifier indicated in the first reply, a second reply that indicates the first identifier comprises:
determining that information in the first reply corresponds to a rule programmed by a second switch fabric; and
generating the second reply to not include the information in the first reply determined to correspond to the rule programmed by the second switch fabric.

* * * * *